(12) United States Patent  
Ashwood-Smith et al.

(10) Patent No.: US 9,419,894 B2  
(45) Date of Patent: Aug. 16, 2016

(54) NVGRE BIOMODAL TUNNEL MESH

(71) Applicant: Futurewei Technologies, Inc., Plano, TX (US)

(72) Inventors: Peter Ashwood-Smith, Gatineau (CA); Guoli Yin, Ottawa (CA); Yapeng Wu, Nepean (CA)

(73) Assignee: Futurewei Technologies, Inc., Plano, TX (US)

( * ) Notice: Subject to any disclaimer, the term of this patent is extended or adjusted under 35 U.S.C. 154(b) by 448 days.

(21) Appl. No.: 13/874,307

(22) Filed: Apr. 30, 2013

(65) Prior Publication Data

US 2013/0287028 A1 Oct. 31, 2013

Related U.S. Application Data

(60) Provisional application No. 61/640,499, filed on Apr. 30, 2012.

(51) Int. Cl.
*H04L 12/46* (2006.01)
*H04L 12/741* (2013.01)
*H04L 29/12* (2006.01)

(52) U.S. Cl.
CPC ............ *H04L 45/74* (2013.01); *H04L 12/4633* (2013.01); *H04L 12/4641* (2013.01); *H04L 61/103* (2013.01)

(58) Field of Classification Search
None
See application file for complete search history.

(56) References Cited

U.S. PATENT DOCUMENTS

| | | | | |
|---|---|---|---|---|
| 2012/0106559 A1* | 5/2012 | Kim | ............ | H04L 63/029 370/401 |
| 2012/0311568 A1* | 12/2012 | Jansen | ............ | G06F 9/45558 718/1 |
| 2013/0058346 A1* | 3/2013 | Sridharan | ............ | H04L 45/586 370/392 |
| 2013/0124750 A1* | 5/2013 | Anumala | ............ | H04L 12/4625 709/232 |
| 2013/0142201 A1* | 6/2013 | Kim | ............ | H04L 12/4633 370/392 |
| 2013/0250951 A1* | 9/2013 | Koganti | ............ | H04L 49/356 370/390 |
| 2013/0283270 A1* | 10/2013 | Holland | ............ | G06F 9/45533 718/1 |

OTHER PUBLICATIONS

Sridharan, NGRE: Network Virtualization using Generic Routing Encapsulation draft-sridharan-virtualization-nvgre-00.txt, Sep. 2011, Network Working Group.*
M. Sridharan, et al., "NVGRE: Network Virtualization using Generic Routing Encapsulation," draft-sridharan-virtualization-nvgre-00.txt, Network Working Group, IETF Draft, Sep. 2011, pp. 1-19.

* cited by examiner

*Primary Examiner* — Mohammad Adhami
(74) *Attorney, Agent, or Firm* — Conley Rose, P.C.; Grant Rodolph; William H. Dietrich

(57) ABSTRACT

A method implemented by a hypervisor located in a first network device (ND), the method comprising sending to and receiving from a second ND a first type of packet, wherein each packet of the first type of packet comprises media access control (MAC) layer information of a client; and sending to and receiving from a third ND a second type of packet, wherein each packet of the second type of packet contains no client MAC layer information.

23 Claims, 5 Drawing Sheets

NVGRE BIOMODAL TUNNEL MESH

CROSS-REFERENCE TO RELATED APPLICATIONS

The present application claims priority to U.S. Provisional Patent Application No. 61/640,499 filed Apr. 30, 2012 by Peter Ashwood-Smith et al. and entitled "NVGRE Bimodal Tunnel Mesh", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern data center networks comprise network devices (NDs) or nodes that transport data through a data center network. The nodes may include servers, routers, switches, bridges, or combinations thereof that transport individual data packets or frames through the network. Some networks may offer data services that forward data frames or packets from one node to another node across the network without using pre-configured routes on intermediate nodes. Other networks may forward the data frames or packets from one node to another node across the network along pre-configured or pre-established paths.

A ND (e.g., server) in a data center may comprise a plurality of virtual machines (VMs) that run above a hypervisor (or VM manger) and managed by the hypervisor. Hypervisors in multiple network devices in the data center may create an emulated Layer 2 (L2) domain to connect the VMs. In addition, there may be a gateway (e.g., a default gateway) in the data center, which may perform Layer 3 (L3) routing between L2 domains or to other L3 domains. The emulation may use an encapsulation of a L2 packet on an Internet Protocol (IP) packet. Sometimes, different NDs may require different encapsulations of packets for communication with other NDs. For example, some hardware only-implemented gateways may require generic routing encapsulation-IP (GRE-IP) based encapsulation, while some software and hardware-implemented servers may require network virtualization over generic routing encapsulation (NVGRE) based encapsulation. In this case, packets encapsulated using different protocols may encounter potential issues when being forwarded between different NDs, e.g., between a server and a gateway.

SUMMARY

In one embodiment, the disclosure includes a method implemented by a hypervisor located in a first network device (ND), the method comprising sending to and receiving from a second ND a first type of packet, wherein each packet of the first type of packet comprises media access control (MAC) layer information of a client; and sending to and receiving from a third ND a second type of packet, wherein each packet of the second type of packet contains no client MAC layer information.

In another embodiment, the disclosure includes an apparatus comprising one or more virtual machines (VMs), and a first hypervisor coupled to the one or more VMs and configured to communicate with a second hypervisor via a network virtualization over generic routing encapsulation (NVGRE) tunnel, and communicate with a gateway via a GRE-internet protocol (GRE-IP) tunnel.

In yet another embodiment, the disclosure includes a method implemented by a server located in a data center network comprising generating a first packet by encapsulation in a first mode, wherein a header of the first packet comprises a client C-IP address and a client C-MAC address corresponding to the C-IP address, generating a second packet by encapsulation in a second mode, wherein a header of the second packet comprises a second C-IP address but contains no C-MAC address corresponding to the second C-IP address, transmitting the first packet to an additional server, and transmitting the second packet to a gateway of the data center network.

In yet another embodiment, the disclosure includes a first network device (ND) comprising one or more virtual machines (VMs), and a first hypervisor coupled to the one or more VMs and configured to send to and receive from a second ND a first type of packet, wherein each packet of the first type of packet comprises media access control (MAC) layer information of a client, and send to and receive from a third ND a second type of packet, wherein each packet of the second type of packet contains no client MAC layer information.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
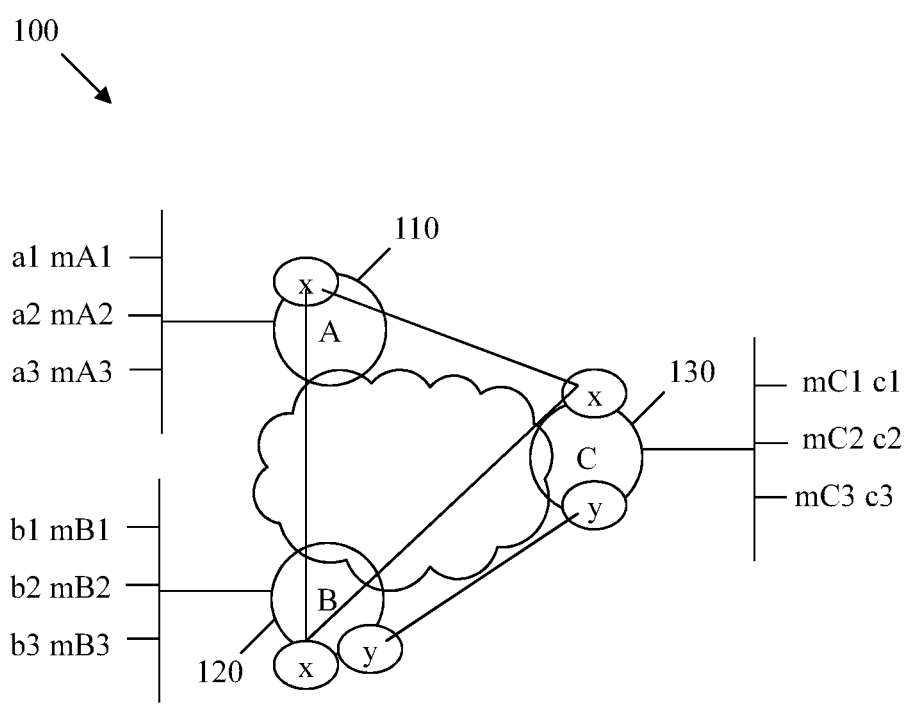
FIG. 1 illustrates an embodiment of a data center network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A virtual private network (VPN) may sometimes be created on top of an existing network (e.g., data center network) to enable a host network device (ND) to communicate with other NDs (e.g., by sending and receiving data across shared or public networks) as if they were an integral part of a private network with functionality, security, and/or management policies of the private network. A VPN may establish a tunnel, which may be a virtual point-to-point connection, between two NDs through the use of dedicated connections, encryption, or both.

NVGRE is an encapsulation protocol that may be used in a VPN set up in a data center. NVGRE may encapsulate traffic (e.g., in the form of data packets) between members in the same Layer 2 (L2) subnet by creating an overlay for that subnet on top of the internet protocol (IP) layer. Accordingly, a packet encapsulated via NVGRE may comprise information regarding a client IP layer and a client media access control (MAC) layer. The MAC layer information may allow a VPN based on NVGRE to emulate an Ethernet network. However, the NVGRE may not be supported by some hardware, e.g., high performance application specific integrated circuits (ASICs) in gateways. Instead, the ASIC-based gateways may support GRE-IP encapsulation (sometimes referred to in short as GRE). A packet encapsulated via GRE-IP may comprise information regarding a client IP layer but may not contain any information regarding a corresponding client MAC layer. The different encapsulation modes supported by different tunnels may bring barriers to data communication between network devices. For example, MAC layer information contained in a packet may not be able to be properly processed by a gateway ASIC at full line rates. Accordingly, it may be desirable to create a mesh of NVGRE and GRE-IP tunnels, so that data may be communicated across all members of a L2 VPN regardless of hardware support.

Disclosed herein are systems, apparatuses, and methods for creating a bimodal mesh of NVGRE and GRE-IP tunnels in a VPN. A disclosed scheme may allow for routers or gateways that do not support NVGRE to act as gateways in a VPN comprising NVGRE tunnels. Specifically, this disclosure describes the use of at least two types of tunnels (bimodal) and adaptation mechanisms needed to forward data from one type of tunnel to the other type of tunnel. Packets encapsulated by NVGRE may comprise MAC layer information of clients, while packets encapsulated by GRE-IP may contain no MAC layer information of clients. In addition, IP layer information of clients may be included in both situations. Hypervisors located in servers may serve as the point where conversion from one encapsulation to the other takes place.

FIG. 1 illustrates an embodiment of a data center network 100, in which disclosed embodiments may operate. For illustrative purposes, the network 100 comprises three NDs 110, 120, and 130, although it should be understood that the network 100 may comprise any suitable number of NDs. Each of the NDs 110, 120, and 130 may be a server, a computer, a router, a switch, a gateway, or any other type of device capable of network communication with other NDs. Suppose, for example, that the ND 110 (denoted as A) is a gateway of the network 100, while the ND 120 (denoted as B) and the ND 130 (denoted as C) are both servers or computer systems. Each of the NDs 120 and 130 may comprise one or more VMs and a VM manager or hypervisor configured to manage the one or more VMs. For example, as shown in FIG. 1, the ND 110 may comprise three VMs, whose IP addresses are denoted as a1, a2, and a3 and corresponding MAC addresses are denoted as mA1, mA2, and mA3 respectively. The ND 120 may comprise three VMs, whose IP addresses are denoted as b1, b2, and b3 and corresponding MAC addresses are denoted as mB1, mB2, and mB3 respectively. The ND 130 may comprise three VMs, whose IP addresses are denoted as c1, c2, and c3 and corresponding MAC addresses are denoted as mC1, mC2, and mC3 respectively. Note that the NDs 110, 120, and 130 may each comprise the same or different number of VMs or hosts.

Some or all of the resources present in the network 100 may be utilized to build one or more VPNs on top of the network 100. Each VPN may be owned by a tenant and used to serve clients or customers of the tenant. For example, as shown in FIG. 1, a first tenant (denoted as x) owns some of the resources (e.g., a set of VMs in the NDs 110, 120, and 130) or logical instance of the network 100 to create a first VPN, and a second tenant (denoted as y) owns some of the other resources (e.g., a set of VMs in the NDs 120 and 130) to create a second VPN. Each node in a VPN may communicate with other nodes via tunneling. A tunnel may be a virtualized p2p connection, which may be realized using any of a variety of tunneling techniques. A packet being transmitted in a tunnel includes some information to indicate that it is a tunnel communication, and may identify its corresponding tunnel from other tunnels. A packet referred to herein may be configured or formatted using any suitable technique. Each VPN may be considered a subnet of the network 100. Sometimes, the network 100 itself may also be considered a subnet of a larger network.

According to an embodiment disclosed herein, some tunnels in the network 100 may be NVGRE tunnels, while other tunnels in the network 100 may be GRE-IP tunnels. A main difference between these two types of tunnels may lie in whether encapsulated packets comprise MAC layer information of a client. Since NVGRE is a MAC layer-based protocol, it may use GRE encapsulation to encapsulate a client MAC (C-MAC) address and a corresponding client IP (C-IP) address into a data frame or a packet. In an embodiment, the header of a packet encapsulated via NVGRE comprises the following information: B-MAC|B-IP|GRE [key=Tenant/Subnet]|C-MAP|C-IP|C-Payload, wherein B-MAC address may indicate a MAC address of a backbone node, B-IP address may indicate an IP address of the backbone, C-MAC may indicate an IP address of a client or customer IP (C-IP), C-IP may indicate an IP address of the client or customer, and GRE key may indicate an encapsulation header that provides a 'KEY'. A backbone node may refer to a physical source or destination of a packet, while a client or customer may refer to the logical source or destination of a packet. A GRE key may be a logical isolation mechanism that identifies a tenant or a subnet. The GRE key may logically isolate tenants from each other, e.g., by including a tenant network identification (ID).

When moving data from one point to another (e.g., from A to B) using NVGRE tunneling, there may be multiple layers of addresses. For instance, outer addressing may indicate a physical network to move data from one point to another (e.g., a packet from A to B may have the IP addresses of A and B in the outer portion of the packet). Inner addressing may indicate host (e.g., VMs or applications) addresses within a subnet or a tenant (e.g., a packet from a VM in A to a VM in B may have a1 and b1 as the inner addresses). Sometimes, middle addressing may indicate L2 (e.g., MAC or Ethernet) addresses of ports on VMs (e.g., a packet from a VM in A to a VM in B may have mA1 and mB1 as the middle addresses). In comparison with NVGRE, packets encapsulated using GRE-IP may not have any MAC layer information of clients. In an embodiment, a mesh of tunnels may create a logical layer 2 between participating devices, which will be further described below.

Figure 2:
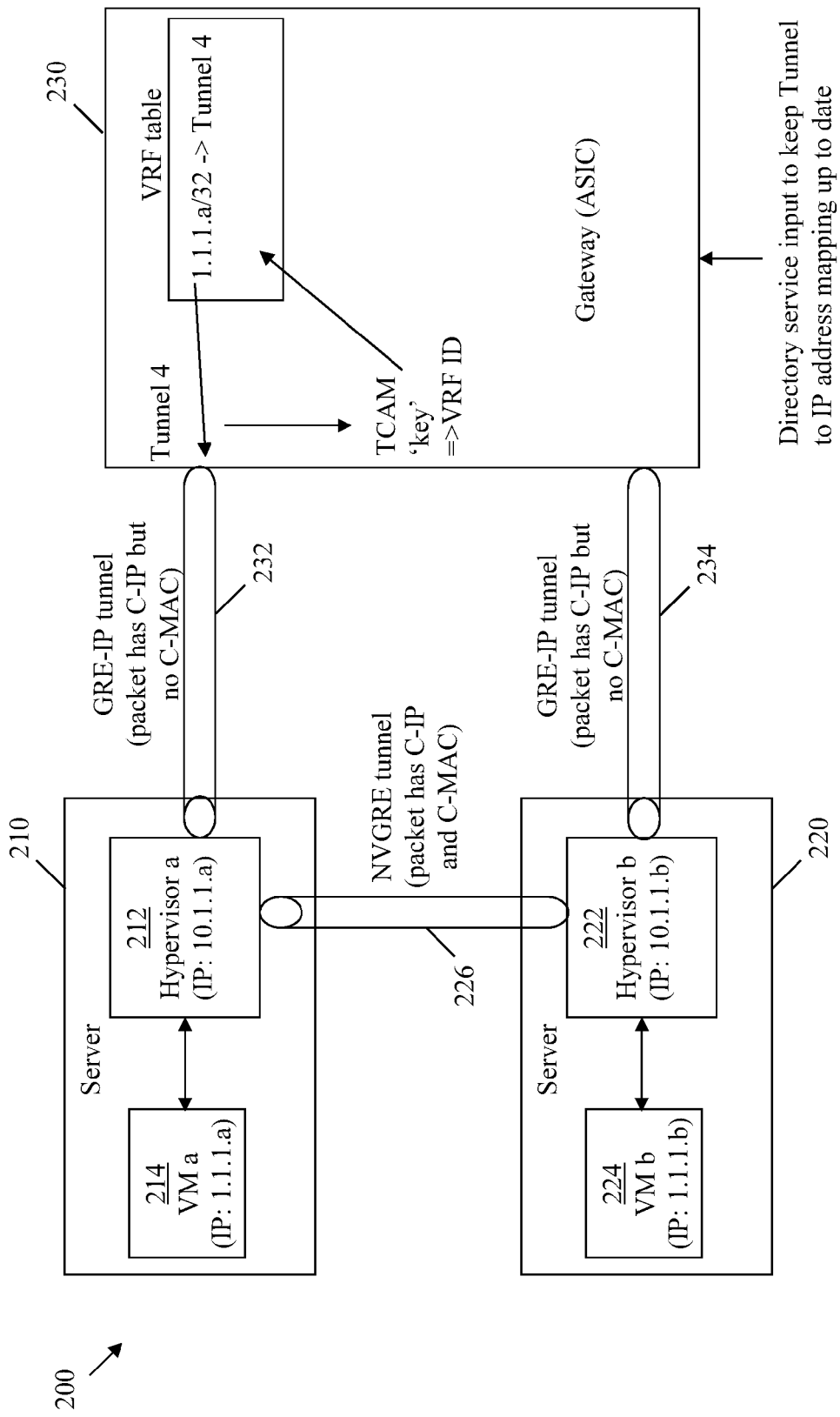
FIG. 2 illustrates an embodiment of a virtual private network (VPN).

FIG. 2 illustrates an embodiment of a VPN 200, which may be part of a data center network, such as the network 100. For illustrative purposes, the VPN 200 comprises a server 210, a server 220, and a gateway 230, although it should be understood that the VPN 200 may comprise any suitable number and/or type of NDs. The server 210 may comprise a hypervisor 212 and one or more VMs (only one VM 214 shown in FIG. 2 for clarity). The hypervisor 212 may be coupled to the VM 214 and configured to manage the VM 214. For example, the VM 214 may communicate with other devices through the hypervisor 212, which may comprise or have access to data communication components such as transceiver, network interface controller (NIC), and/or virtual switch (vSwitch). The hypervisor 212 may be configured to forward packets from the VM 214 to other NDs (e.g., the server 220 and the gateway 230) or from the other NDs to the VM 214. The server 220 may be configured similarly to the server 210. For example, the server 220 may comprise a hypervisor 222 and one or more VMs (only one VM 224 shown in FIG. 2). The gateway 230 may serve as an access node of the VPN 200 to or from the outside world, such as other VPNs or the Internet.

In an embodiment, a mesh of NVGRE and GRE-IP tunnels are used in the VPN 200 to facilitate packet communication between devices that support different encapsulation protocols. Specifically, normal NVGRE tunnels are used to talk between hypervisors. As shown in FIG. 2, a NVGRE tunnel 226 is used for communication between the hypervisor 212 and the hypervisor 222. The NVGRE tunnel 226 may encapsulate packets to include both C-IP and C-MAC addresses. Since NVGRE is supported by software but not yet by all hardware, NVGRE may be readily performed by the hypervisors 212 and 222, which may be implemented as software or a combination of software and hardware.

On the other hand, to allow routers that do not support NVGRE to act as gateways for NVGRE, GRE-IP tunnels may be introduced into a mesh of NVGRE tunnels. As shown in FIG. 2, a GRE-IP tunnel 232 may be used for communication between the hypervisor 212 and the gateway 230, and another GRE-IP tunnel 234 may be used for communication between the hypervisor 222 and the gateway 230. The GRE-IP tunnels 232 and 234 may encapsulate packets to include only C-IP addresses but no C-MAC addresses of the hypervisor 212 or 222 or the gateway 230. Since packet transmitted or received by the gateway 230 may comprise only IP layer information, the gateway 230 may be able to forward packets to/from the hypervisors 212 and 222 using only hardware and no software. Compared to NVGRE, GRE-IP encapsulation may be supported by hardware, such as ASICs in gateways and fast core switches. Hardware used by the gateway 230 may be based on an ASIC.

The hypervisors 212 and 222 may need to recognize when communication is between two hypervisors or between a hypervisor and a gateway. For example, the hypervisor 212 may talk to/from the gateway 230, in which case the hypervisor 212 may drop the C-MAC, if present, from a packet. For another example, the hypervisor 212 may talk to/from the hypervisor 222, in which case the hypervisor 212 may ensure that a C-MAC is included in every packet. Therefore, this may allow two types of tunnel in the VPN 200, where one type (i.e., GRE-IP) may be specifically used to talk to the gateway 230, while the other type (i.e., NVGRE) may be used to talk to NDs other than the gateway 230.

In an embodiment, a hypervisor (e.g., hypervisor 212) in a first ND (e.g., the server 210) may send to and receive from a second ND (e.g., the server 220) a first type of packet (i.e., packets encapsulated by NVGRE), wherein each packet of the first type of packet comprises MAC layer information of a client. For example, after receiving a packet of the second type (denoted as P1) from the gateway 230, the hypervisor 212 may de-encapsulate P1 to obtain a first C-IP address, look up a first C-MAC address based on the first C-IP address, and forward data contained in P1 to the VM 214 coupled to the hypervisor 212 and locatable using the first C-MAC address. Further, looking up the first C-MAC address may use mapping information between the first C-IP address and the first C-MAC address, wherein the mapping information may be obtained via a directory service (e.g., active directory provided by MICROSOFT) in distributed databases. The directory service may be an independent mechanism maintained by the data center network. Also, the hypervisor 212 may add or insert the locally known C-MAC based on a lookup of the C-IP.

The hypervisor 212 may further send to and receive from a third ND (e.g., the gateway 230) a second type of packet (i.e., packets encapsulated by GRE-IP), wherein each packet of the second type of packet contains no client MAC layer information (e.g., a C-MAC address). The client MAC layer information is not necessary for communication between the hypervisor 212 and the gateway 230 may be unnecessary, since an IP address of a client has a one-to-one relationship with a MAC address of the client, and the relationship is known by the hypervisor 212. In an embodiment, the second type of packet may comprise a packet denoted as P2 (can be any packet of the second type), wherein P2 is encapsulated by the hypervisor 212 such that any C-MAC address present in P2 is stripped or removed prior to sending P2 to the server 220. This adaptation functionality in the hypervisor 212 may realize format conversion necessary for the hypervisor 212 to forward packets to and from the hypervisor 222 and the gateway 230.

In some cases, the only difference between GRE-IP and NVGRE may be the C-MAC. Thus, the C-MAC may be dropped to terminate and originate at GRE-IP tunnels that are on existing ASICs in core switches, which may operate at line rates of 40 or 100 Giga Hertz per second. In an embodiment, the gateway 230 may be implemented using pure hardware, such as an ASIC. Since the gateway 230 may be a routing or switching device equipped with a high number of ports and connected to a high number of NDs, hardware-only encapsulation may help achieve higher performance (e.g., higher speed, less power consumption).

An ASIC in the gateway 230 may locate a GRE KEY, which may be or comprise a virtual routing and forwarding identifier (VRF ID). For instance, a Content Addressable Memory (CAM) match may verify a VRF ID. Existing ASICs may also insert any GRE KEY (e.g. it may be transparent on encapsulation) to packets. For instance, a VRF table in the gateway 230 may be designed for a particular tenant, in which the gateway 230 may have a 32-bit address for every VM belonging to the tenant. The gateway 230 may also have a pointer to a tunnel (e.g., tunnel 4 as shown in FIG. 2). In a traffic direction from the gateway 230 to a hypervisor (e.g., the hypervisor 212), a packet may have a destination IP address of 1.1.1.a (32 bits address). In case of a full match between the IP in the VRF table and an IP in the packet, the packet is routed to tunnel 4, which is a GRE-IP tunnel. Directory service (e.g., active directory) may be used to keep all IP addresses up to date, e.g., to indicate which VM is in which hypervisor.

VM to VM tunneling (via hypervisors) may remain in NVGRE as long as tunneling does not touch any gateway. A hypervisor may lookup C-IP in a table stored in the hypervisor and populate C-MAC prior to inserting a packet into a VM stack. Further, B-IP to B-MAC and C-MAC to C-IP relationships may be learned via distributed databases, such as Active Directory. Address resolution protocol (ARP) or multicast (MCAST) may not be needed. Alternatively, multicast may be emulated by serial unicast over each tunnel to participating end points. IP multicast may not be needed. The combination of NVGRE and GRE-IP may be used in a bimodal fashion such that all of the behaviors of an NVGRE mesh may be met by incorporating or adding logic to deal with the insertion and/or deletion of C-MACs by the hypervisors. Doing so may allow existing NVGRE solution to work at a line rate of 40 or 100 Giga bits per second and to have ASIC-based tunnel termination for inter-subnet or traffic into (southbound) and out of (northbound) data center traffic.

Figure 3:
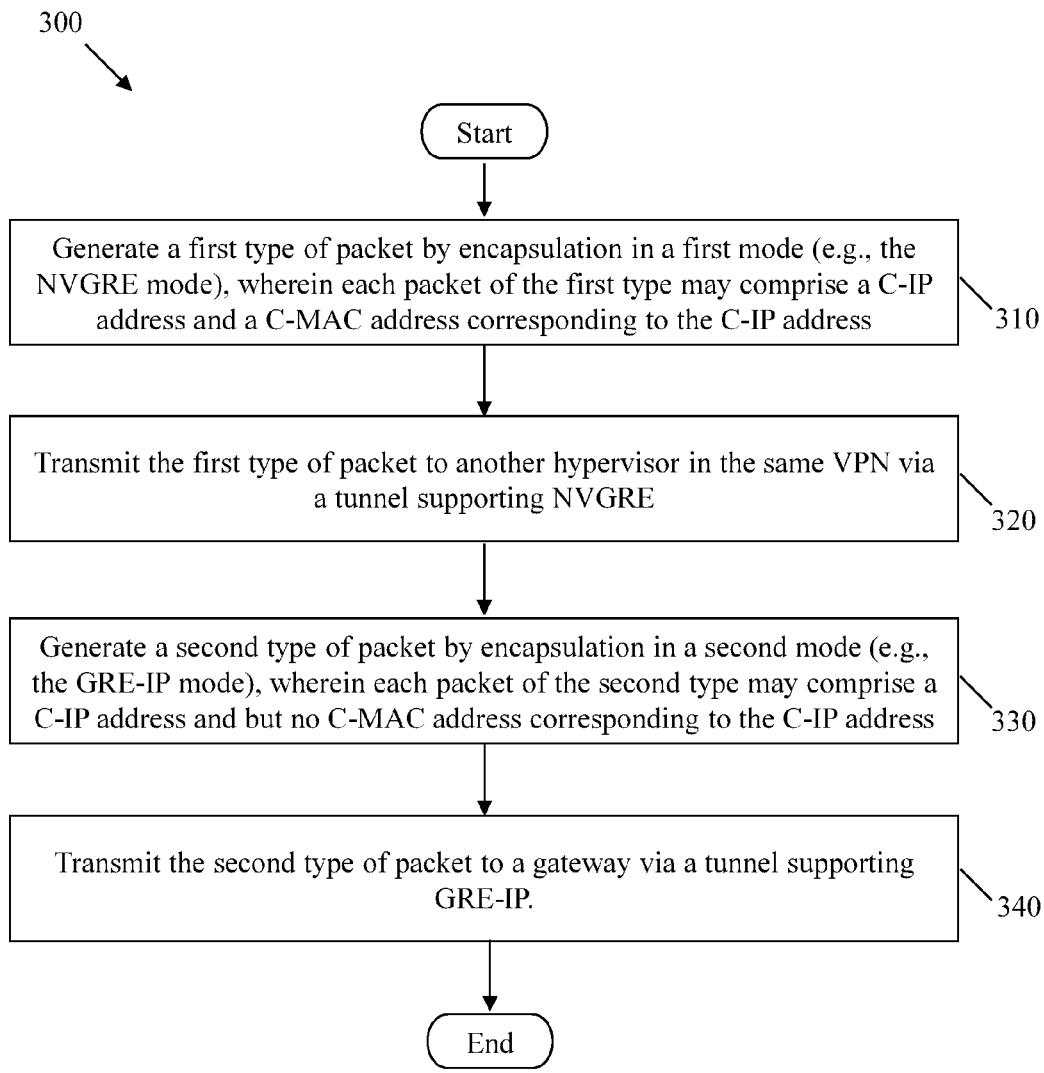
FIG. 3 illustrates an embodiment of a packet communication method.

FIG. 3 illustrates an embodiment of a packet communication method 300, which may be implemented by a hypervisor (e.g., the hypervisor 212) in a VPN (e.g., the VPN 200). The method 300 starts in step 310, in which the hypervisor may generate a first type of packet by encapsulation in a first mode (e.g., the NVGRE mode), wherein a header of each packet of the first type may comprise a C-IP address and a C-MAC address corresponding to the C-IP address. In step 320, the hypervisor may transmit the first type of packet to another hypervisor (e.g., the hypervisor 222) in the same VPN via a tunnel supporting NVGRE. Note that packets may go through any number of intermediate nodes before reaching the destination hypervisor. In step 330, the hypervisor may generate a second type of packet by encapsulation in a second mode (e.g., the GRE-IP mode), wherein a header of each packet of the second type may comprise a C-IP address and but no C-MAC address corresponding to the C-IP address. In step 340, the hypervisor may transmit the second type of packet to a gateway (e.g., the gateway 230) via a tunnel supporting GRE-IP. Note that the gateway may be a router or switch in the same VPN as the hypervisor.

It should be understood that the method 300 may only serve as one example to illustrate the bimodal tunnel mesh disclosed herein. A person of ordinary skill in the art will recognize that packets of the first type may also be generated by another hypervisor and received by the hypervisor implementing the method 300 from a NVGRE tunnel. In addition, packets of the second type may be generated by a gateway and received by the hypervisor implementing the method 300 from a GRE-IP tunnel. Further, depending on the direction of traffic, additional steps may be conducted accordingly by the hypervisor. For example, when a packet of the second type is received by a hypervisor, the hypervisor may look up a C-IP address in the inner portion of a packet, and then use the C-IP address to obtain a corresponding C-MAC address. The hypervisor may further use the C-MAC address (e.g., may be the Ethernet address of a port assigned to a VM) to determine which VM to forward the packet to. Moreover, the execution steps of the method 300 may be changed flexibly, if desired, as long as a following step does not depend on its preceding step. For example, the step 330 may be performed before, simultaneously with, or after the step 310. In the interest of conciseness, other variations are not further illustrated one by one.

Figure 4:
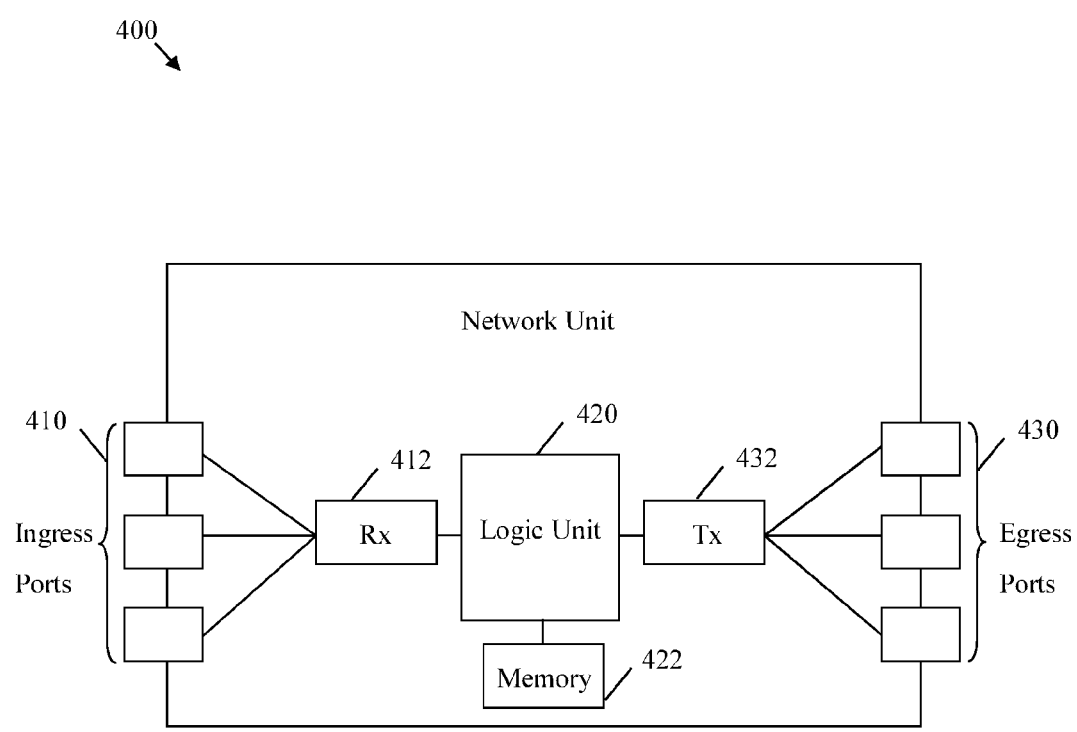
FIG. 4 illustrates an embodiment of a network unit.

FIG. 4 illustrates an embodiment of a network device or unit 400, which may be any device configured to transport packets through a network. For instance, the network unit 400 may correspond to any of the NDs 110, 120, and 130. The network unit 400 may comprise one or more ingress ports 410 coupled to a receiver 412 (Rx), which may be configured for receiving packets or frames, objects, options, and/or Type Length Values (TLVs) from other network components. The network unit 400 may comprise a logic unit or processor 420 coupled to the receiver 412 and configured to process the packets or otherwise determine to which network components to send the packets. The logic unit or processor 420 may be implemented using hardware, software, or both. The network unit 400 may further comprise a memory 422. A hypervisor (e.g., the hypervisor 212 or 222) may be implemented using a combination of the logic unit 420 and the memory 422. The network unit 400 may also comprise one or more egress ports 430 coupled to a transmitter 432 (Tx), which may be configured for transmitting packets or frames, objects, options, and/or TLVs to other network components. The logic unit or processor 420, the receiver 412, and the transmitter 432 may also be configured to implement or support any of the schemes and methods described above, such as the method 300.

Figure 5:
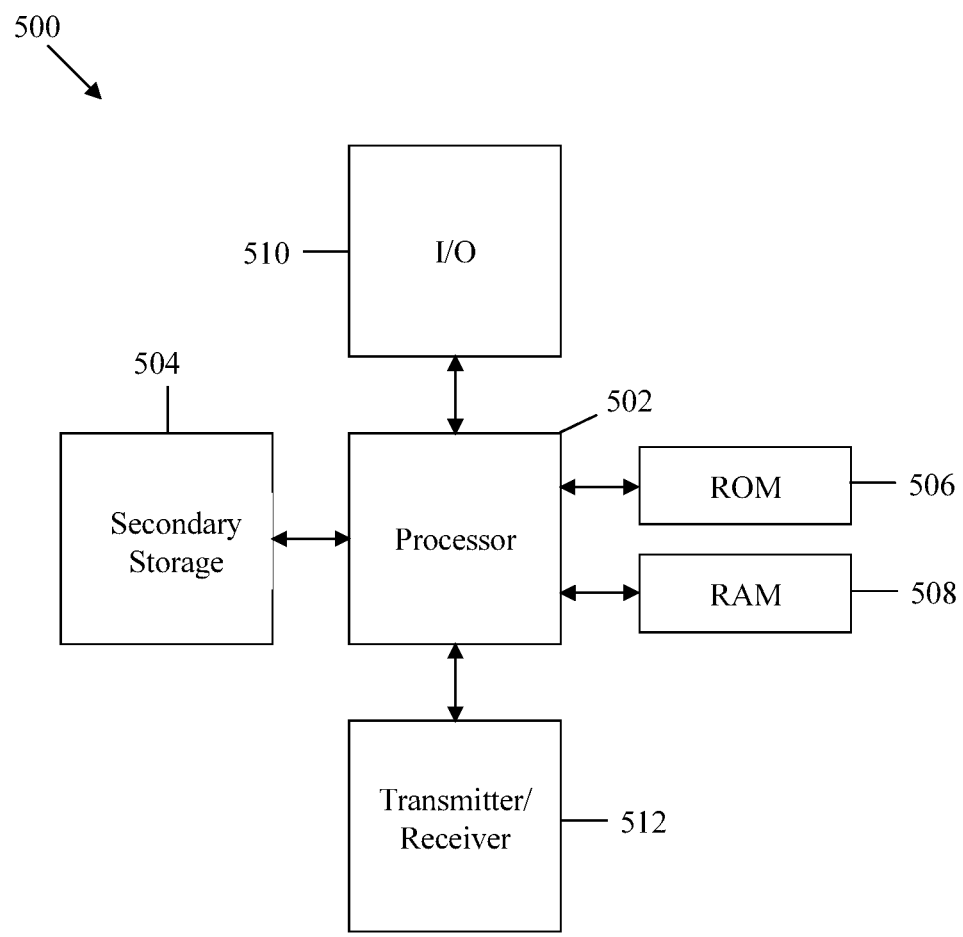
FIG. 5 illustrates an embodiment of a network device.

The schemes described above may be implemented on a network component, such as a computer or network component with sufficient processing power, memory resources, and network throughput capability to handle the necessary workload placed upon it. FIG. 5 illustrates an embodiment of a computer system or ND 500 suitable for implementing one or more embodiments of the systems and methods disclosed herein, such as the NDs 110-130, the servers 210 and 220, the gateway 230, and the method 300.

The ND 500 includes a processor 502 that is in communication with memory devices including secondary storage 504, read only memory (ROM) 506, random access memory (RAM) 508, input/output (I/O) devices 510, and transmitter/receiver 512. Although illustrated as a single processor, the processor 502 is not so limited and may comprise multiple processors. The processor 502 may be implemented as one or more central processor unit (CPU) chips, cores (e.g., a multi-core processor), field-programmable gate arrays (FPGAs), application specific integrated circuits (ASICs), and/or digital signal processors (DSPs). The processor 502 may be configured to implement any of the schemes described herein, including the method 300. The processor 502 may be implemented using hardware or a combination of hardware and software.

The secondary storage 504 is typically comprised of one or more disk drives or tape drives and is used for non-volatile storage of data and as an over-flow data storage device if the RAM 508 is not large enough to hold all working data. The secondary storage 504 may be used to store programs that are loaded into the RAM 508 when such programs are selected for execution. The ROM 506 is used to store instructions and perhaps data that are read during program execution. The ROM 506 is a non-volatile memory device that typically has a small memory capacity relative to the larger memory capacity of the secondary storage 504. The RAM 508 is used to store volatile data and perhaps to store instructions. Access to both the ROM 506 and the RAM 508 is typically faster than to the secondary storage 504.

The transmitter/receiver 512 (sometimes referred to as a transceiver) may serve as an output and/or input device of the ND 500. For example, if the transmitter/receiver 512 is acting as a transmitter, it may transmit data out of the ND 500. If the transmitter/receiver 512 is acting as a receiver, it may receive data into the ND 500. Further, the transmitter/receiver 512 may include one or more optical transmitters, one or more optical receivers, one or more electrical transmitters, and/or one or more electrical receivers. The transmitter/receiver 512 may take the form of modems, modem banks, Ethernet cards, universal serial bus (USB) interface cards, serial interfaces, token ring cards, fiber distributed data interface (FDDI) cards, and/or other well-known network devices. The transmitter/receiver 512 may enable the processor 502 to communicate with an Internet or one or more intranets. The I/O devices 510 may be optional or may be detachable from the rest of the ND 500. The I/O devices 510 may include a video monitor, liquid crystal display (LCD), touch screen display, or other type of display. The I/O devices 510 may also include one or more keyboards, mice, or track balls, or other well-known input devices.

It is understood that by programming and/or loading executable instructions onto the ND 500, at least one of the processor 502, the secondary storage 504, the RAM 508, and the ROM 506 are changed, transforming the ND 500 in part into a particular machine or apparatus (e.g. a server (e.g., the server 210) comprising a hypervisor (e.g., the hypervisor 212) or a gateway (e.g., the gateway 230) having the functionality taught by the present disclosure). The executable instructions may be stored on the secondary storage 504, the ROM 506, and/or the RAM 508 and loaded into the processor 502 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by a hypervisor located in a first network device (ND), the method comprising:
    recognizing, by the hypervisor, that a virtual private network (VPN) has been established such that the first ND is able to communicate with a second ND via a first tunnel and the first ND is able to communicate with a third ND via a second tunnel, wherein the first tunnel and the second tunnel support different encapsulation protocols;
    exchanging with the second ND a first type of packet over the first tunnel between the first ND and the second ND based on the recognition, wherein each packet of the first type of packet comprises media access control (MAC) layer information of a client; and
    exchanging with the third ND a second type of packet based on the recognition, wherein each packet of the second type of packet contains no client MAC layer information.

2. The method of claim 1, wherein the MAC layer information is a client MAC (C-MAC) address, wherein each packet of the first and second types of packet comprises a client internet protocol (C-IP) address, and wherein the C-IP address in each packet of the first type corresponds to the C-MAC address in the same packet.

3. The method of claim 2, wherein the first tunnel between the first and second NDs supports network virtualization over generic routing encapsulation (NVGRE), and wherein exchanging the second type of packet uses a second tunnel between the first and third NDs that supports generic routing encapsulation-internet protocol (GRE-IP), but not NVGRE.

4. The method of claim 2, wherein the first, second, and third NDs are all included in a virtual private network (VPN), wherein the second ND comprises a second hypervisor and one or more virtual machines (VMs) coupled to the second hypervisor, and wherein the third ND is a gateway of the VPN.

5. The method of claim 4, wherein the gateway comprises one or more application specific integrated circuits (ASICs), and wherein each packet of the second type received from the gateway is encapsulated using the one or more ASICs.

6. The method of claim 4, wherein after receiving a packet of the second type from the third ND, the method further comprises:
de-encapsulating the packet of the second type to obtain a first C-IP address;
looking up a first C-MAC address based on the first C-IP address; and
forwarding data contained in the packet of the second type to a VM coupled to the hypervisor and locatable using the first C-MAC address.

7. The method of claim 6, wherein looking up the first C-MAC address comprises using mapping information between the first C-IP address and the first C-MAC address, and wherein the mapping information is obtained via a directory service.

8. The method of claim 4, further comprising encapsulating a packet of the second type such that any C-MAC address is removed from the packet of the second type prior to sending the packet of the second type to the third ND.

9. The method of 4, wherein each packet of the first type of packet further comprises:
an IP address of the first ND;
an IP address of any of the one or more VMs coupled to the hypervisor;
a MAC address of any of the one or more VMs; and
a GRE key field comprising information of a tenant, wherein a client identified by the C-IP address is part of the tenant.

10. An apparatus comprising:
one or more virtual machines (VMs); and
a first hypervisor coupled to the one or more VMs and configured to:
recognize that a virtual private network (VPN) has been established such that the apparatus is able to communicate with a second apparatus via a first tunnel and the apparatus is able to communicate with a gateway via a second tunnel, wherein the first tunnel and the second tunnel support different encapsulation protocols;
communicate with a second hypervisor within the second apparatus via a network virtualization over generic routing encapsulation (NVGRE) tunnel between the apparatus and the second apparatus based on the recognition; and
communicate with the gateway via a GRE-internet protocol (GRE-IP) tunnel based on the recognition.

11. The apparatus of claim 10, wherein communicating with the second hypervisor comprises transmitting to and receiving from the second hypervisor a first type of packet, and wherein each packet of the first type of packet comprises a client internet protocol (C-IP) address and a client media access control (C-MAC) address corresponding to the C-IP address.

12. The apparatus of claim 10, wherein communicating with the gateway comprises exchanging with the gateway a second type of packet, and wherein each packet of the second type of packet comprises a C-IP address but contains no C-MAC address corresponding to the C-IP address.

13. The apparatus of claim 12, wherein the apparatus, the second hypervisor, and the gateway are all part of a virtual private network (VPN) based on a MAC layer.

14. The apparatus of claim 12, wherein the hypervisor is further configured to:
after receiving a packet of the second type from the gateway,
de-encapsulate the packet of the second type to obtain a first C-IP address;
obtain a first C-MAC address based on the first C-IP address; and
forward data contained in the packet of the second type to one of the VMs which is locatable using the first C-MAC address.

15. The apparatus of claim 14, wherein obtaining the first C-MAC address comprises using mapping information between the first C-IP address and the first C-MAC address, and wherein the mapping information is obtained via a directory service.

16. The apparatus of claim 12, wherein the hypervisor is further configured to generate a packet of the second type via NVGRE such that any C-MAC address is removed from the packet of the second type prior to sending the packet of the second type to the gateway.

17. The apparatus of claim 12, wherein at least part of the hypervisor is implemented using software, and wherein the gateway comprises one or more application specific integrated circuits (ASICs) configured to generate by encapsulation each packet of the second type that is received from the gateway.

18. A method implemented by a first server located in a data center network comprising:
recognizing that a virtual private network (VPN) has been established such that the first server is able to communicate with a second server via a first tunnel and the first server is able to communicate with a gateway via a second tunnel, wherein the first tunnel and the second tunnel support different encapsulation protocols;
generating a first packet by encapsulation in a first mode, wherein a header of the first packet comprises a client internet protocol (C-IP) address and a client media access control (C-MAC) address corresponding to the C-IP address;
generating a second packet by encapsulation in a second mode, wherein a header of the second packet comprises a second C-IP address but contains no C-MAC address corresponding to the second C-IP address;
transmitting the first packet to the second server over the first tunnel between the first server and the second server based on the recognition; and
transmitting the second packet to the gateway of the data center network over the second tunnel based on the recognition.

19. The method of claim 18, further comprising:
receiving a third packet from the second server, wherein a header of the third packet comprises a third C-IP address and a third C-MAC address corresponding to the third C-IP address; and
receiving a fourth packet from the gateway, wherein a header of the fourth packet comprises a fourth C-IP address but contains no C-MAC address corresponding to the fourth C-IP address.

20. The method of claim 19, wherein the tunnel supports network virtualization over generic routing encapsulation (NVGRE), and wherein the second and fourth packets are transmitted to or received from the gateway via another tunnel supporting generic routing encapsulation-internet protocol (GRE-IP).

21. A first network device (ND) comprising:
one or more virtual machines (VMs); and
a first hypervisor coupled to the one or more VMs and configured to:
recognize that a virtual private network (VPN) has been established such that the first network device (ND) is able to communicate with a second ND via a first tunnel and the first ND is able to communicate with a third ND via a second tunnel, wherein the first tunnel and the second tunnel support different encapsulation protocols
exchange with the second ND a first type of packet over the first tunnel between the first ND and the second ND based on the recognition, wherein each packet of the first type of packet comprises media access control (MAC) layer information of a client; and
exchange with the third ND a second type of packet based on the recognition, wherein each packet of the second type of packet contains no client MAC layer information.

22. The first ND of claim 21, wherein the MAC layer information is a client MAC (C-MAC) address, wherein each packet of the first and second types of packet comprises a client internet protocol (C-IP) address, and wherein the C-IP address in each packet of the first type corresponds to the C-MAC address in the same packet.

23. The first ND of claim 22, wherein the first tunnel between the first and second NDs supports network virtualization over generic routing encapsulation (NVGRE), and wherein exchanging the second type of packet uses a second tunnel between the first and third NDs that supports generic routing encapsulation-internet protocol (GRE-IP), but not NVGRE.

* * * * *